(12) United States Patent
Fangauf et al.

(10) Patent No.: US 9,410,627 B2
(45) Date of Patent: Aug. 9, 2016

(54) SEAL ARRANGEMENT WITH IMPROVED SHAFT BUSHING FOR A ROTATING SHIP PROPELLER SHAFT

(71) Applicant: Blohm + Voss Industries GmbH, Hamburg (DE)

(72) Inventors: Carlos Fangauf, Hamburg (DE); Lars Ziemen, Hamburg (DE)

(73) Assignee: Blohm + Voss Industries GmbH, Hamburg (DE)

( * ) Notice: Subject to any disclaimer, the term of this patent is extended or adjusted under 35 U.S.C. 154(b) by 105 days.

(21) Appl. No.: 13/868,342

(22) Filed: Apr. 23, 2013

(65) Prior Publication Data

US 2013/0300068 A1  Nov. 14, 2013

(30) Foreign Application Priority Data

May 12, 2012 (DE) .......................... 10 2012 009 478

(51) Int. Cl.
*F16J 15/32* (2016.01)
*B63H 23/32* (2006.01)
*F16J 15/00* (2006.01)

(52) U.S. Cl.
CPC .............. *F16J 15/32* (2013.01); *B63H 23/321* (2013.01); *F16J 15/002* (2013.01); *F16J 15/3256* (2013.01); *B63B 2231/06* (2013.01); *B63B 2231/14* (2013.01); *B63H 2023/327* (2013.01)

(58) Field of Classification Search
CPC ........................... F16J 15/3268; F16J 15/3256
USPC ......................................... 277/353, 551, 571
See application file for complete search history.

(56) References Cited

U.S. PATENT DOCUMENTS

| | | | | | |
|---|---|---|---|---|---|
| 3,207,521 | A | * | 9/1965 | Dega | 277/568 |
| 3,214,180 | A | * | 10/1965 | Hudson et al. | 277/571 |
| 3,773,336 | A | * | 11/1973 | Walter et al. | 277/551 |
| 3,788,100 | A | * | 1/1974 | Pitner | 464/11 |
| 3,902,726 | A | * | 9/1975 | Hisada | 277/563 |
| 3,920,250 | A | * | 11/1975 | Eklund | 277/555 |
| 4,781,102 | A | * | 11/1988 | Scerbo et al. | 91/41 |
| 5,082,294 | A | * | 1/1992 | Toth et al. | 277/551 |
| 5,219,434 | A | | 6/1993 | Von Bergen et al. | |
| 5,308,269 | A | | 5/1994 | von Bergen et al. | |
| 5,643,026 | A | | 7/1997 | Pietsch et al. | |

(Continued)

FOREIGN PATENT DOCUMENTS

| | | |
|---|---|---|
| DE | 1 183 399 | 12/1964 |
| DE | 71 19 832 U | 11/1971 |
| DE | 25 17 913 | 11/1976 |
| DE | 28 39 816 | 3/1980 |
| DE | 33 27 421 | 2/1985 |
| DE | 37 42 079 | 6/1989 |

(Continued)

*Primary Examiner* — Kristina Fulton
*Assistant Examiner* — L. Susmitha Koneru
(74) *Attorney, Agent, or Firm* — W. F. Fasse

(57) ABSTRACT

A seal arrangement for sealing a propeller shaft where it penetrates through the hull of a watercraft includes a shaft bushing around this portion of the shaft, one or more seal rings forming a seal around the shaft bushing, and a stationary support holding the seal ring or rings. The shaft bushing includes an outer bushing part made of a wear-resistant material, arranged coaxially around an inner bushing part made of a material having a high thermal conductivity. The thickness of the outer part relative to the thickness of the inner part is a ratio in a range from 1:10 to 1:3. The two-part shaft bushing can provide optimized thermal conductivity and heat dissipation away from the seal rings to the cool exterior water environment, as well as optimized wear-resistance, corrosion resistance and reduced friction for the seal rings.

21 Claims, 1 Drawing Sheet

(56) References Cited

U.S. PATENT DOCUMENTS

| | | | |
|---|---|---|---|
| 5,820,132 A * | 10/1998 | Marnot | 277/551 |
| 6,979,002 B2 * | 12/2005 | Ramsay | 277/551 |
| 8,828,178 B2 * | 9/2014 | Yamamoto et al. | 156/281 |
| 2004/0007821 A1 * | 1/2004 | Ramsay | 277/353 |
| 2007/0222161 A1 | 9/2007 | Voydatch et al. | |

FOREIGN PATENT DOCUMENTS

| | | |
|---|---|---|
| DE | 41 05 042 | 8/1992 |
| DE | 41 35 709 | 5/1993 |
| GB | 480524 | 2/1938 |
| GB | 2 144 185 | 2/1985 |
| GB | 2 213 539 | 8/1989 |

* cited by examiner

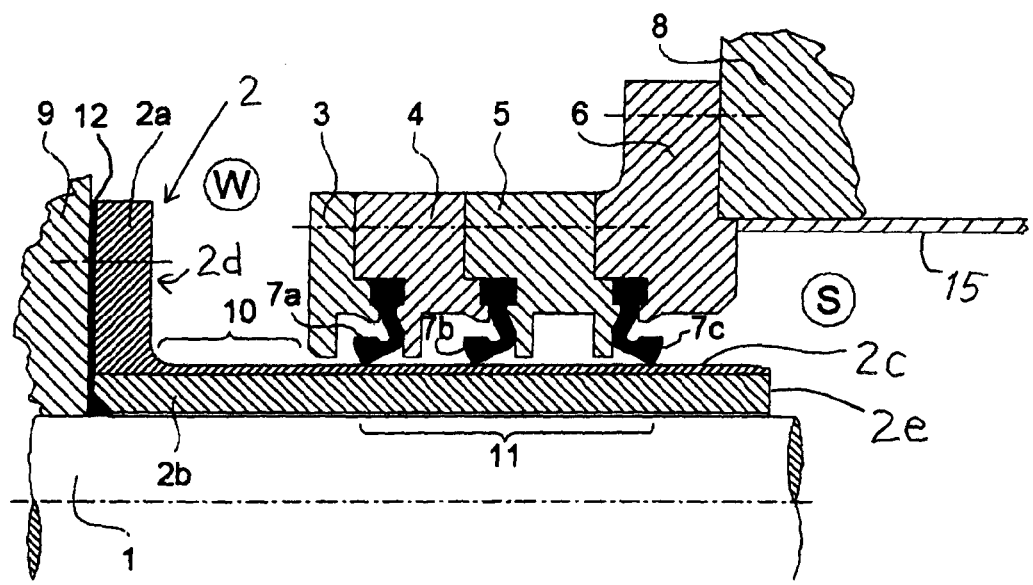

SEAL ARRANGEMENT WITH IMPROVED SHAFT BUSHING FOR A ROTATING SHIP PROPELLER SHAFT

PRIORITY CLAIM

This application is based on and claims the priority under 35 USC 119 of German Patent Application 10 2012 009 478.7, filed on May 12, 2012, the entire disclosure of which is incorporated herein by reference.

FIELD OF THE INVENTION

The invention relates to a seal arrangement using one or more seal rings around a shaft bushing for sealing around the rotating shaft that drives a watercraft propeller, between an exterior side exposed to a relatively cool liquid medium such as seawater and an interior side exposed to a relatively warm medium such as lubricating oil.

BACKGROUND INFORMATION

Various types and configurations of seal arrangements, bushings, packing boxes, stuffing boxes and the like are known for providing a seal around the rotating shaft that drives a ship's propeller, where the shaft penetrates through the stern of the ship from the interior to the exterior of the ship's hull. The seal arrangement must effectively prevent water from the exterior environment, i.e. from the exterior of the hull below the waterline, leaking into the interior of the hull where the shaft penetrates through the hull, while still allowing the shaft to rotate. Preferably, the seal arrangement must also dissipate the frictional heat that arises due to rubbing friction of the seal elements on the rotating shaft or the shaft bushing, and further should provide a long operating life and allow easy maintenance.

One known type of seal arrangement uses plural seal rings spaced axially from one another along the propeller shaft or shaft bushing, whereby the seal rings are held by a stationary support system such as a housing and/or stern tube. The seal rings may be embodied as lip seals and/or slide ring seals that make sliding contact with the shaft bushing provided around the propeller shaft. Even though various different configurations or embodiments of such seal arrangements are known, it has been found in practice that further improvements would be desirable. For example, it has been found that the seal rings, which are typically made of an elastomeric synthetic plastic, are negatively influenced by the high temperatures arising in the seal rings and in the surrounding media during operation, i.e. rotation, of the shaft, due to the frictional heating caused by the frictional sliding contact of the seal rings on the shaft or shaft bushing and due to contact with the hot lubricating oil.

Namely, the elastomeric plastic seal rings suffer a degradation and breakdown of the plastic material over time due to the arising high temperatures, and therefore suffer more rapid wear and deformation. This results in a disruption or deformation of the proper geometry of the seal gap between each seal ring and the shaft bushing, and thus permits leakage of the liquid media (e.g. seawater and/or lubricating oil) through the seal arrangement.

More particularly, on one side a portion of the seal arrangement is in contact with or exposed to the exterior seawater, which is generally at a relatively cool temperature, and on the other side another portion of the seal arrangement is in contact with or exposed to the lubricant in the stern tube, which lubricant is typically at a relatively warm or hot temperature. Namely, the lubricant, typically a lubricating oil, becomes heated due to frictional heating of the ball bearings, roller bearings or slide bearings that support the propeller shaft as the shaft rotates during operation. An additional significant heating contribution arises locally in the seal gap of the seal arrangement due to the frictional sliding contact of each seal ring on the shaft bushing. As a result, in view of the relatively low thermal conductivity of the elastomeric plastic material of the seal ring, this can give rise to a strong temperature increase especially directly at the seal lip of each seal ring. Due to the existence of different heated areas (e.g. friction at the seal lips and friction of the rotational bearings) and cooled areas (seawater contact area), this gives rise to a thermal flux through the components from the warmer areas to the cooler areas, and especially a thermal flux through the shaft bushing from the area of the lubricating oil and the area of the seal rings to the area in contact with the cooler seawater. Thus, the resulting temperature of the overall seal arrangement, and especially the temperature of the seal rings and the seal lips thereof, is predominantly determined by the thermal conductivity of the shaft bushing.

In addition to an adequate thermal conductivity, the shaft bushing must also satisfy other requirements, i.e. exhibit other characteristics. Namely, the shaft bushing carries out or ensures several functions, for example a corrosion protection of the propeller shaft relative to the corrosive seawater, and a defined counter running surface for the sliding contact with the seal rings having a prescribed and tested tribologic behavior, as well as the abovementioned conduction of heat away from the seal arrangement to the cooler seawater. These various different requirements or demands on the shaft bushing are substantially contrary to one another. Namely, a material of the shaft bushing that satisfies one of the above requirements, typically does not entirely satisfy the other requirements.

In order to increase the operating life of the seal rings and thus correspondingly increase the associated maintenance intervals, it has been recognized as desirable to reduce the operating temperature of the seal rings. An arrangement for achieving this has been proposed in the prior art, for example according to German Patent DE 41 35 709 C. That known arrangement uses heat pipes to conduct heat away from the area of the seal rings. A disadvantage of such a construction using heat pipes is the relatively high complexity, effort and expense for the production, construction, installation and maintenance of such a seal arrangement using relatively complex and technically demanding cooling elements. Furthermore, these heat pipe cooling elements have a relatively small cross-sectional area in the direction toward the heat sink, so that special measures or efforts must be taken in order to avoid a non-uniform distribution of the cooling agent and thus the cooling effect.

SUMMARY OF THE INVENTION

In view of the above, it is an object of the invention to provide an economical and simple seal arrangement of the general type discussed above, which has been improved in a simple manner to ensure an increased removal and dissipation of heat away from the seal rings and/or bearings, and simultaneously fulfills the requirements of a suitable counter running surface for sliding contact with the seal rings. Another object of the invention is to avoid the use of technically complex heat pipes, volatile cooling agents, and active systems, by providing a completely passive or inactive cooling by improved thermal conduction whenever a temperature difference exists between the seal rings or the lubricating oil in the stern tube on the one hand and the cooler seawater on the other hand. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a seal arrangement for sealing a rotating shaft of a watercraft propeller. The term "propeller" herein is used generally and broadly, and covers not only an open or exposed axial flow propeller, but also all types of ducted propellers and pump impellers e.g. in a water jet drive system. The term "watercraft" herein is used generally and broadly, and covers all ships, boats, submarines and all other craft that operate in or on water. The inventive seal arrangement includes a shaft bushing arranged around a portion of the shaft that extends through the seal arrangement, one or more seal rings forming a seal between an exterior side and an interior side around the shaft bushing, and a stationary support such as a housing that carries the seal ring or rings. Especially according to the invention, the shaft bushing comprises at least two concentric bushing sleeves or shells respectively of different materials. An outer part of the shaft bushing, e.g. an outer bushing sleeve, consists of a wear-resistant material. An inner part of the shaft bushing, e.g. an inner bushing sleeve, consists of a material having a high thermal conductivity. Preferably, the wear-resistant material of the outer bushing sleeve has a greater wear resistance than the material of the inner bushing sleeve, while the material of the inner bushing sleeve has a greater thermal conductivity than the material of the outer bushing sleeve. Further according to the invention, the wall thickness of the outer bushing sleeve relative to the wall thickness of the inner bushing sleeve are in a ratio or proportion in a range from 1:10 to 1:3. More particularly, this ratio of the outer bushing sleeve thickness to the inner bushing sleeve thickness is in a range from 1:5 to 1:3.5 in a particular embodiment. This wall thickness is preferably a thickness measured radially, and is preferably uniform along the entire axial length of the respective cylindrical annular sleeve component.

With the special construction of the shaft bushing according to the invention, the inventive seal arrangement advantageously achieves all the requirements discussed above in an improved or optimized manner. Namely, the inventive seal arrangement achieves a significant temperature reduction of the seal rings due to the increased thermal conductivity and thus thermal conduction capability of the shaft bushing, while also providing a good or optimized, wear-resistant and low-friction sliding counter surface for the sealing contact of the shaft bushing with the seal rings. Furthermore, the inventive seal arrangement further exhibits a relatively low expense, effort and complexity as to the materials, components and construction as well as the maintenance thereof. The improved thermal conduction and thermal dissipation is very significant among the advantages of the inventive seal arrangement. The thermal conduction occurs over the entire length of the shaft protection sleeve or shaft bushing from the lubrication chamber within the stern tube to the exterior seawater side. In this regard, by making use of the physical principle of passive or inactive thermal conduction through the highly thermally conductive material of the inner bushing sleeve, the invention achieves a simple, durable, robust, "automatic" and maintenance-free cooling arrangement that avoids the need for volatile cooling media, active cooling systems, and complex additional cooling elements.

In one or more advantageous embodiments of the inventive arrangement, the outer bushing sleeve is formed of stainless steel or especially duplex steel as the wear-resistant material, and the inner bushing sleeve is made of bronze or brass as the material having a high thermal conductivity.

Furthermore, in another advantageous embodiment, in order to provide an especially good sliding contact counter surface for the seal rings, the shaft bushing is additionally provided with an outer coating layer on the outer surface, or at least the pertinent portion of the outer surface, of the outer bushing sleeve. For example, this coating is preferably embodied as a hard metal coating or a ceramic coating, preferably or especially having a hardness greater than that of the material of the outer bushing part.

BRIEF DESCRIPTION OF THE DRAWINGS

In order that the invention may be clearly understood, it will now be explained in further detail in connection with an example embodiment thereof, with reference to the accompanying drawing, in which the single drawing FIGURE schematically shows a cross-section through a seal arrangement with a two-part shaft bushing according to the invention.

DETAILED DESCRIPTION OF A PREFERRED EXAMPLE EMBODIMENT AND BEST MODE OF THE INVENTION

The single drawing FIGURE schematically shows a cross-section through a broken-out portion of the structural arrangement where a rotating propeller shaft 1 of a watercraft such as a ship or boat passes outwardly through the hull of the watercraft, particularly through a stern frame boss 8 of the hull. The illustrated partial area especially shows a seal arrangement according to the invention, which seals the rotating ship propeller shaft 1 relative to an exterior water environment, typically cool seawater W on the exterior side, and a warmer lubricant such as lubricating oil S inside a stern tube 15 on the interior side. The lubricating oil S becomes heated during rotating operation of the shaft 1, due to the frictional heating of rotation bearings (not shown) that rotatably support the shaft 1, and due to the frictional heating of the seal arrangement.

A two-part shaft bushing 2 is arranged coaxially around a portion of the shaft 1 where it passes through the seal arrangement. The bushing 2 may be mounted on or connected to the shaft 1 in any known manner. In the illustrated embodiment, the shaft bushing 2 includes or forms a flange portion 2*d* that protrudes radially outwardly from the exterior end of an annular cylindrical sleeve portion 2*e* of the shaft bushing 2. The flange portion 2*d* is connected to a propeller hub 9 of the ship propeller, with a flat packing 12 arranged as a fixed seal between the propeller hub 9 and the shaft bushing 2. Thereby, the packing 12 prevents the penetration of water to and along the shaft 1, between the shaft 1 and the shaft bushing 2. Thereby also, the bushing 2 may be connected to the shaft 1 through the propeller hub 9.

The actual rotational seal of the seal arrangement is provided by plural seal rings 7*a*, 7*b* and 7*c* that are securely held in a stationary housing formed by several housing parts 3, 4, 5 and 6. Namely, an outermost seal ring 7*a* is clamped or held between an outermost first housing part 3 and a second housing part 4, a second or middle seal ring 7*b* is clamped or held between the second housing part 4 and a third housing part 5, and the third or innermost seal ring 7*c* is clamped or held between the third housing part 5 and a fourth housing part 6. Alternatively, the construction and arrangement of the seal rings and the housing can be according to any known configurations, materials and structural arrangements of such seal devices. The housing formed of the housing parts 3, 4, 5 and 6 is connected to and held by the stern frame boss or stern post boss 8, which is connected to the rest of the ship's hull and optionally to a stern tube 15.

In the seal area 11 of the seal arrangement, the three seal rings 7a, 7b and 7c slide in frictional contact on the outer surface of the shaft bushing 2, forming a seal gap therebetween in an area 11. Successive seal chambers respectively successively formed between the seal rings 7a and 7b, and the seal rings 7b and 7c may be filled respectively with seawater, pressurized air, and/or lubricating oil, in any known manner. Thereby, through this sliding seal contact of the seal rings 7a, 7b and 7c via the seal gap with the shaft bushing 2, the seal arrangement forms the seal between the seawater W in the exterior environment and the lubricating oil S in the interior environment of the stern tube 15. Thereby, however, the frictional rubbing of the seal rings 7a to 7c on the outer surface of the shaft bushing 2 produces significant frictional heating, which in turn tends to increase the temperature of the seal lips of the seal rings contacting the shaft bushing, as well as the shaft bushing itself. As the shaft bushing 2 is heated from this frictional heating by the seal rings 7a to 7c in the area 11, and from the hot or warm lubricating oil S, the heat is conducted into and along the shaft bushing 2 to the cooler region 10 that is exposed to or in contact with the cool seawater W. As a result, the heat conducted through the shaft bushing 2 is rejected or dissipated into the cool seawater W.

The shaft bushing must provide not only the abovementioned thermal conduction in a direction toward the seawater cooled area 10, but also a corrosion protection of the shaft 1 relative to the seawater W, and a defined sliding contact counter surface for the seal contact with the seal rings 7a to 7c having a specified tribologic behavior. These disparate requirements or demands are at least partially contrary to one another. Thus, to better satisfy these demands, the invention provides that the shaft bushing 2 has a two-part construction including an outer bushing part or sleeve 2a and an inner bushing part or sleeve 2b. The outer bushing part 2a is arranged coaxially around the inner bushing part 2b. The two bushing parts are preferably fused, bonded, mechanically secured or otherwise connected to one another, in any known manner of connecting or combining two different materials for such a two-part construction. The inner bushing part 2b is preferably a cylindrical annular shell or sleeve, while the outer bushing part 2a preferably includes a cylindrical annular shell or sleeve as well as the radially outwardly protruding flange part 2d. The outer bushing part 2a is made of a wear-resistant material, while the inner bushing part 2b is made of a material with a high thermal conductivity. Namely, the material of the outer bushing part 2a has greater wear-resistance than the material of the inner bushing part 2b, while the material of the inner bushing part has greater thermal conductivity than the material of the outer bushing part. In a preferred embodiment, the material of the outer bushing part 2a is stainless steel or especially duplex steel, while the material of the inner bushing part 2b is bronze or brass.

Furthermore, in order to optimize the thermal conductivity of the overall shaft bushing 2, while providing sufficient wear-resistance and corrosion resistance, the wear-resistant outer bushing part 2a is significantly thinner than the heat-conductive inner bushing part 2b. Particularly, the wall thickness of the outer bushing part 2a relative to the thickness of the inner bushing part 2b is in a range from 1:10 to 1:3, or especially in a range from 1:5 to 1:3.5 for example.

A person of ordinary skill in the art is aware of different manufacturing and assembly techniques for constructing the shaft bushing 2 in a two-part manner as herein described. The two parts 2a and 2b can be separately produced and then connected together, or the outer part 2a can be formed, deposited or applied as a layer or outer component on the inner part 2b as a core.

Still further, to increase the wear-resistance of the outer surface of the shaft bushing 2, especially in the area 11 subject to the seal contact friction, at least a portion of the outer surface of the shaft bushing 2 (for example in the seal area 11) is coated with an additional coating layer 2c, which is preferably a hard metal coating or a ceramic coating. The coating 2c may be applied, formed, deposited, provided or connected on the outer surface of the outer bushing part 2a in any conventionally known manner.

With the above described two-part or three-part construction, the shaft bushing 2 provides optimized thermal conductivity for cooling the lubricating oil S and the seal rings 7a to 7c, optimized wear resistance relative to the sliding contact of the seal rings 7a to 7c, and optimized corrosion resistance relative to the seawater W.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A seal arrangement for sealing around a rotatable propeller shaft of a watercraft between an exterior side and an interior side, comprising:

a shaft bushing that is arranged coaxially around said propeller shaft and that extends along said propeller shaft from said interior side to said exterior side;

a stationary support that is arranged coaxially around said shaft bushing with an annular gap therebetween; and at least one seal ring that is carried by said stationary support and that extends and seals around said shaft bushing in said annular gap between said stationary support and said shaft bushing;

wherein:

said shaft bushing comprises an inner bushing part that is made of a first material, and an outer bushing part that is arranged coaxially around said inner bushing part and that is made of a second material different from said first material;

said first material has a higher thermal conductivity than said second material;

said second material has a higher wear resistance than said first material;

a ratio of a second wall thickness of said outer bushing part relative to a first wall thickness of said inner bushing part is in a range from 1:10 to 1:3;

said inner bushing part comprises an annular cylindrical inner bushing sleeve that has said first wall thickness, and that has a radially outer cylindrical surface thereof extending axially along an entire axial length of said shaft bushing to a distal axial end of said shaft bushing on said exterior side;

said outer bushing part comprises an annular cylindrical outer bushing sleeve that has said second wall thickness and that extends axially along said radially outer cylindrical surface of said annular cylindrical inner bushing sleeve to said distal axial end of said shaft bushing on said exterior side, and a flange part protruding radially outwardly from said annular cylindrical outer bushing sleeve on said exterior side, side; and said flange part of said outer bushing part is connected to a propeller hub.

2. The seal arrangement according to claim 1, further comprising a stern tube connected to said stationary support and containing lubricating oil on said interior side, wherein a first portion of said outer bushing part and/or said inner bushing part is exposed to said lubricating oil on said interior side, a second portion of said outer bushing part is exposed to exterior water on said exterior side, and said lubricating oil is warmer than said water during rotating operation of said propeller shaft.

3. The seal arrangement according to claim 1, further comprising a flat seal packing interposed and forming a seal between said shaft bushing and said propeller hub.

4. The seal arrangement according to claim 1, wherein said outer bushing part is exposed to exterior water present on said exterior side, and said inner bushing part is not exposed to said exterior water.

5. The seal arrangement according to claim 1, wherein said first material of said inner bushing part is bronze or brass, and said second material of said outer bushing part is stainless steel.

6. The seal arrangement according to claim 5, wherein said second material of said outer bushing part is duplex stainless steel.

7. A seal arrangement for sealing around a rotatable propeller shaft of a watercraft between an exterior side and an interior side, comprising:
   a shaft bushing that is arranged coaxially around said propeller shaft and that extends along said propeller shaft from said interior side to said exterior side;
   a stationary support that is arranged coaxially around said shaft bushing with an annular gap therebetween; and
   at least one seal ring that is carried by said stationary support and that extends and seals around said shaft bushing in said annular gap between said stationary support and said shaft bushing;
   wherein:
   said shaft bushing comprises an inner bushing part that is made entirely of a first metal, an outer bushing part that is arranged coaxially around said inner bushing part and that is made entirely of a second metal different from said first metal, and a coating on an outer surface of said outer bushing part, wherein said coating comprises a third material different from said first metal and said second metal;
   said first metal has a higher thermal conductivity than said second metal;
   said second metal has a higher wear resistance than said first metal;
   a ratio of a second wall thickness of said outer bushing part relative to a first wall thickness of said inner bushing part is in a range from 1:10 to 1:3;
   said outer bushing part comprises an annular cylindrical outer bushing sleeve having said second wall thickness, and a flange part protruding radially outwardly from said outer bushing sleeve on said exterior side; and
   said flange part is connected to a propeller hub.

8. The seal arrangement according to claim 7, wherein said coating is a hard metal coating, and said third material is a hard metal having a hardness greater than said second metal.

9. The seal arrangement according to claim 7, wherein said coating is a hard ceramic coating, and said third material is a hard ceramic having a hardness greater than said second metal.

10. The seal arrangement according to claim 1, entirely excluding any heat pipe.

11. The seal arrangement according to claim 1, entirely excluding any volatile cooling medium for cooling said seal arrangement.

12. The seal arrangement according to claim 1, entirely excluding any active cooling arrangement for cooling said seal arrangement.

13. The seal arrangement according to claim 1, further comprising a flat seal packing interposed and forming a seal between said propeller hub and said flange part of said outer bushing part, whereby said flat seal packing prevents penetration of water to and along said propeller shaft between said propeller shaft and said inner bushing part.

14. The seal arrangement according to claim 1, wherein said outer bushing part is a monolithic single piece of said second material integrally including both said outer bushing sleeve and said flange part.

15. The seal arrangement according to claim 1, whereby said shaft bushing is connected to said propeller shaft via said propeller hub that is connected to both said propeller shaft and said outer bushing part.

16. The seal arrangement according to claim 1, wherein said outer bushing part is rigidly fixed on said inner bushing part.

17. The seal arrangement according to claim 1, wherein said first material is a first metal and said second material is a second metal.

18. A combination comprising the seal arrangement according to claim 1 and a watercraft propeller, wherein said watercraft propeller includes said propeller hub, which is connected to said flange part of said outer bushing part of said shaft bushing on said exterior side.

19. The combination according to claim 18, further comprising said propeller shaft, wherein said propeller hub is further connected to said propeller shaft, whereby said shaft bushing is connected to said propeller shaft via said propeller hub.

20. The seal arrangement according to claim 1, wherein said flange part of said outer bushing part has an axial thickness greater than said second wall thickness of said annular cylindrical outer bushing sleeve of said outer bushing part.

21. The seal arrangement according to claim 1, wherein said flange part of said outer bushing part has an axial thickness greater than said first wall thickness of said annular cylindrical inner bushing sleeve of said inner bushing part.

* * * * *